(12) United States Patent
Yamamoto

(10) Patent No.: US 9,142,007 B2
(45) Date of Patent: Sep. 22, 2015

(54) ELECTRONIC APPARATUS AND IMAGE PROCESSING METHOD

(71) Applicant: KABUSHIKI KAISHA TOSHIBA, Minato-ku, Tokyo (JP)

(72) Inventor: Koji Yamamoto, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/183,365

(22) Filed: Feb. 18, 2014

(65) Prior Publication Data

US 2014/0307979 A1    Oct. 16, 2014

(30) Foreign Application Priority Data

Apr. 10, 2013 (JP) ................................. 2013-081954

(51) Int. Cl.
    *G06K 9/40*     (2006.01)
    *G06T 5/00*     (2006.01)
    *G06T 5/50*     (2006.01)

(52) U.S. Cl.
    CPC ............. *G06T 5/002* (2013.01); *G06T 5/003* (2013.01); *G06T 5/50* (2013.01); *G06T 2207/20004* (2013.01); *G06T 2207/30168* (2013.01)

(58) Field of Classification Search
    CPC ..... G06T 7/0012; G06T 7/401; G06T 7/0018; G06T 2207/20212; G06T 2207/30004; G06T 2207/10016; G06T 5/00; G06K 9/0014; G06K 9/32; G06K 9/6203
    USPC ........... 382/107, 133, 128, 274; 345/581, 582, 345/583, 589, 596; 348/251, 254
    See application file for complete search history.

(56) References Cited

U.S. PATENT DOCUMENTS

| | | | |
|---|---|---|---|
| 8,275,185 B2 * | 9/2012 | Weng et al. | 382/128 |
| 2008/0304087 A1 * | 12/2008 | Shin et al. | 358/1.6 |
| 2011/0019935 A1 * | 1/2011 | Kelm et al. | 382/275 |
| 2012/0224766 A1 | 9/2012 | Ohki et al. | |

FOREIGN PATENT DOCUMENTS

| | | |
|---|---|---|
| JP | 2009-194700 A | 8/2009 |
| JP | 2012-186593 A | 9/2012 |

* cited by examiner

*Primary Examiner* — Ali Bayat
(74) *Attorney, Agent, or Firm* — Knobbe, Martens, Olson & Bear LLP

(57) ABSTRACT

According to one embodiment, an electronic apparatus includes a calculator and a processor. The calculator calculates a weighted average image between a first image, a second image and a third image, by using a weight based on a difference between the first image and the second image and a difference between the first image and the third image. The processor applies, based on the weight, an image quality process of a first intensity to a first position in the weighted average image, applies an image quality process of a second intensity weaker than the first intensity to a second position in the weighted average image and to applies an image quality process of a third intensity weaker than the second intensity to a third position in the weighted average image.

18 Claims, 8 Drawing Sheets

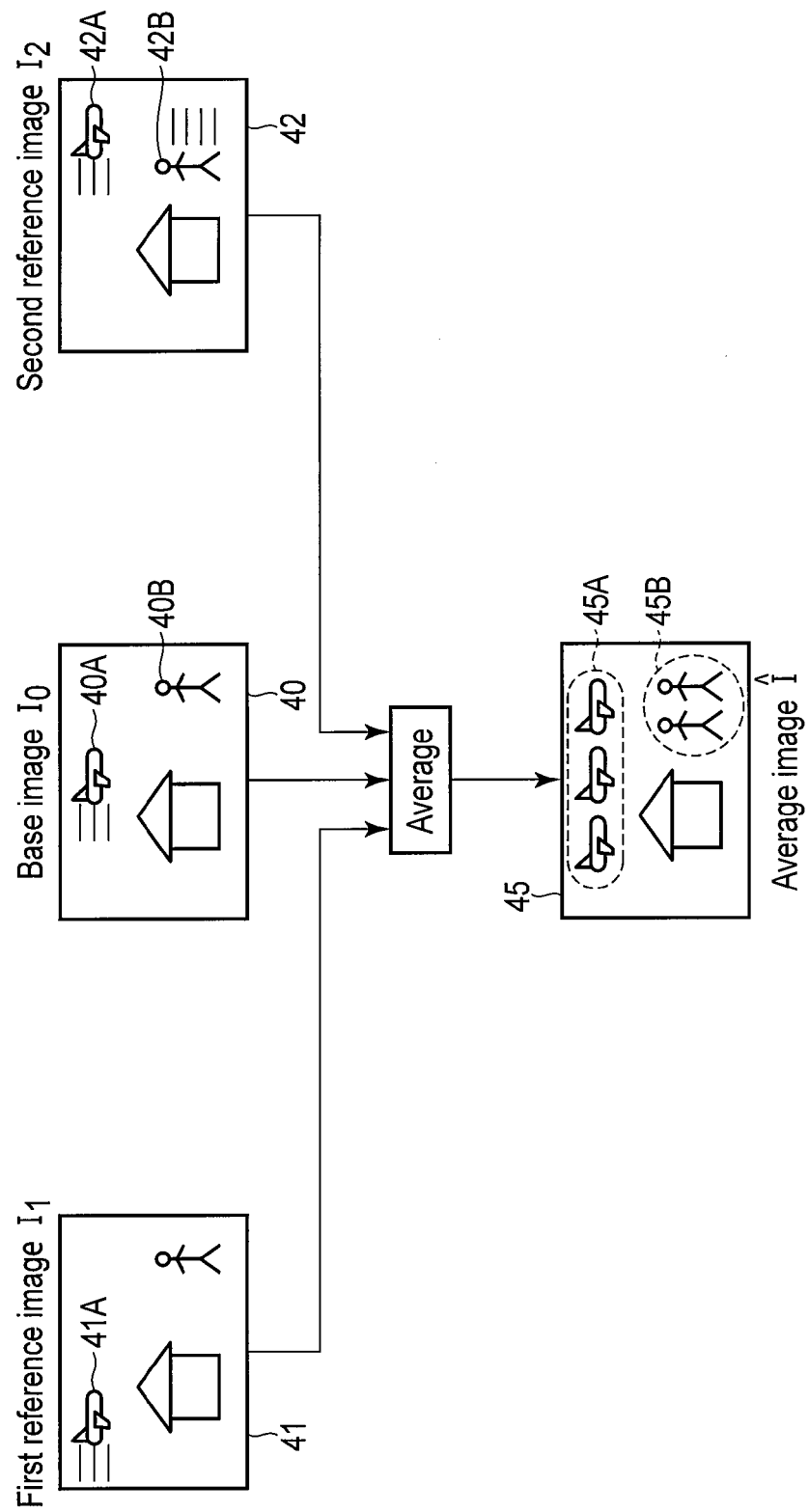
F I G. 3

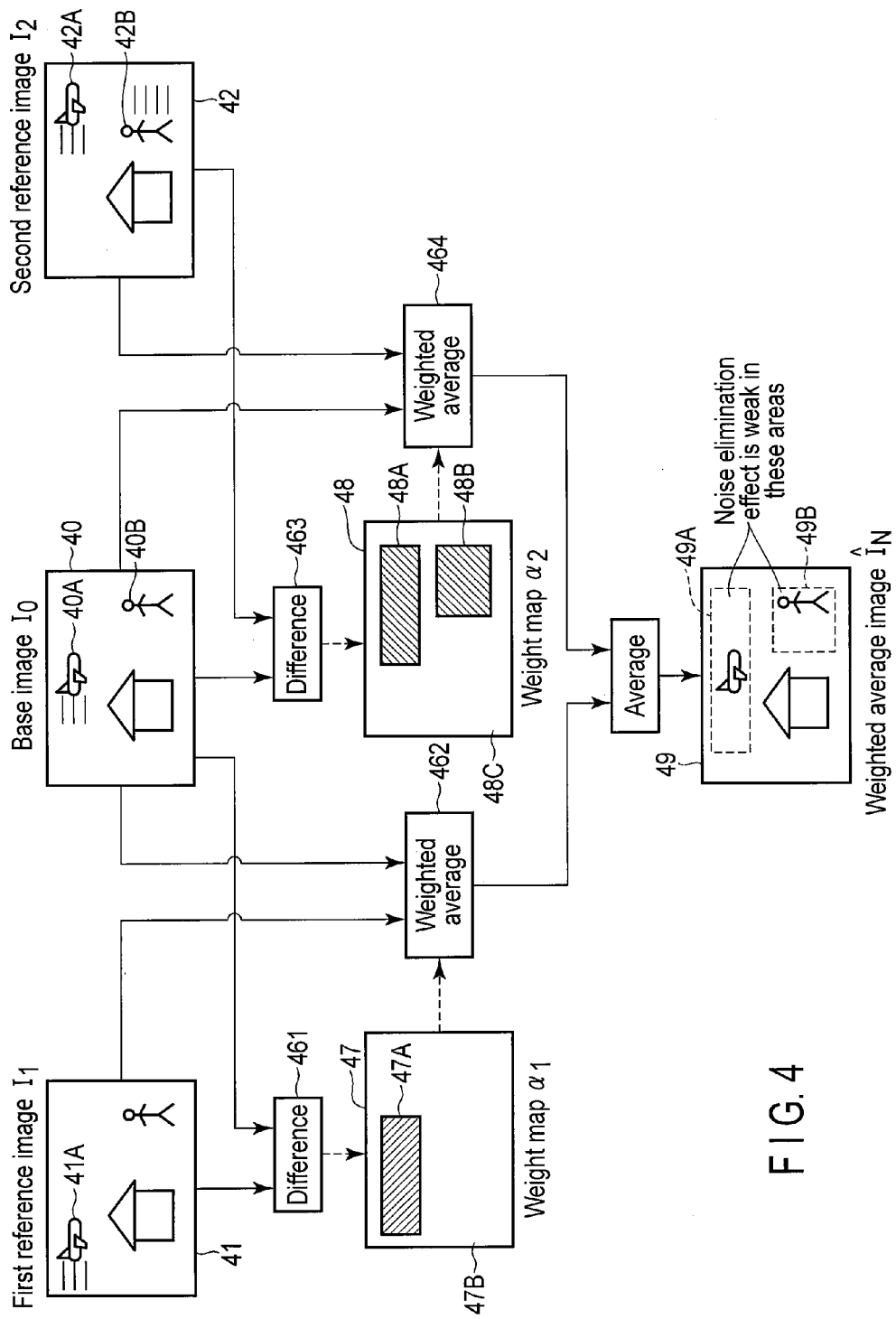
F I G. 4

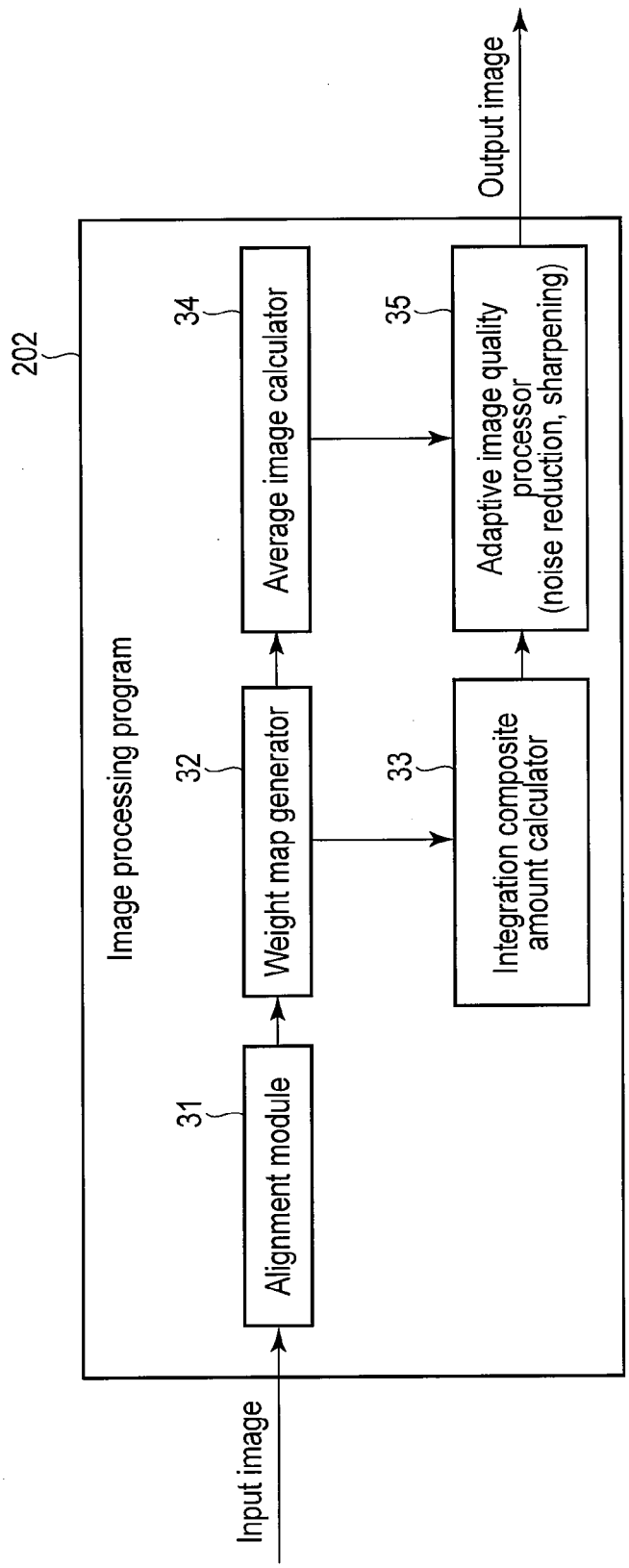
F I G. 5

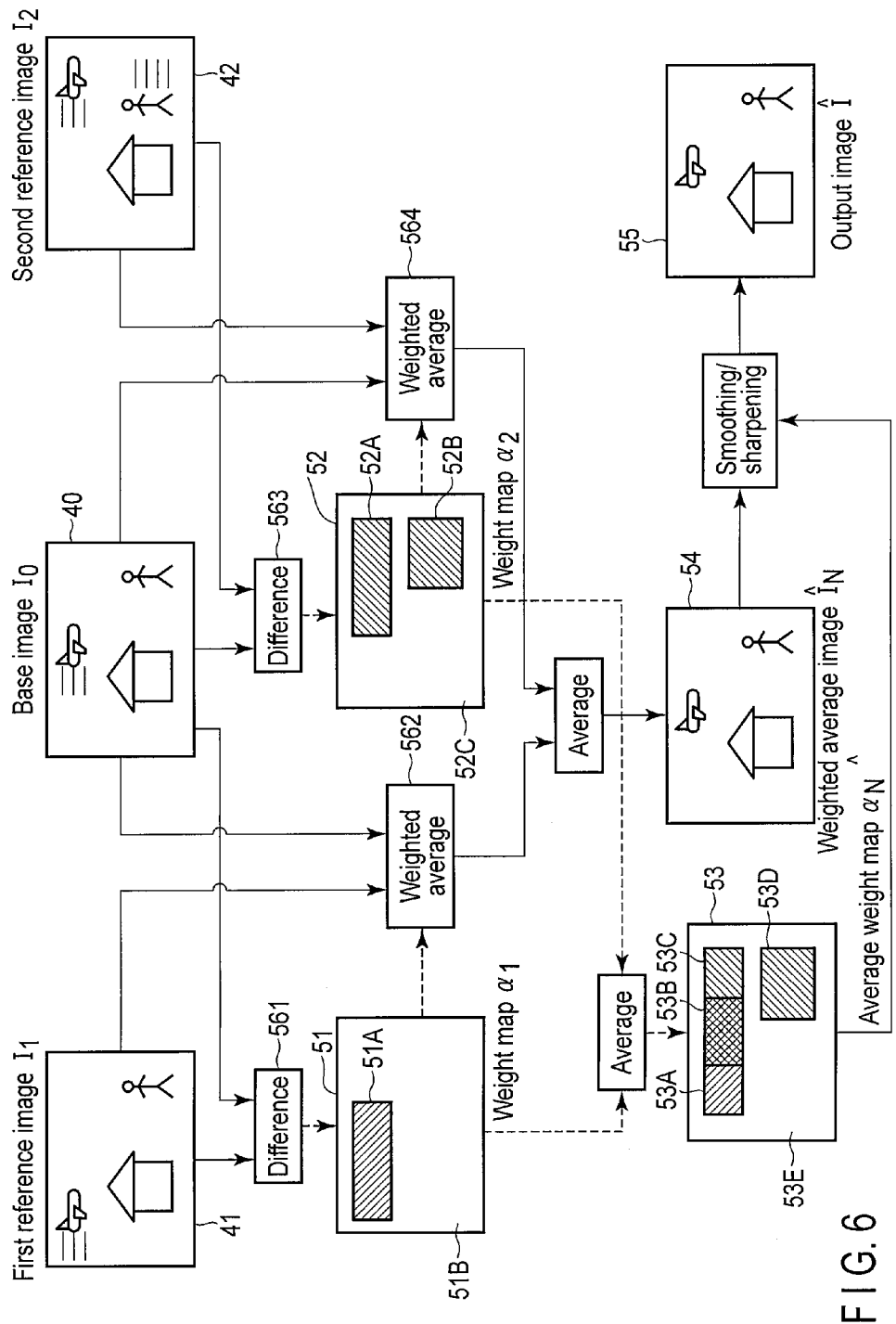
F I G. 6

ELECTRONIC APPARATUS AND IMAGE PROCESSING METHOD

CROSS-REFERENCE TO RELATED APPLICATIONS

This application is based upon and claims the benefit of priority from Japanese Patent Application No. 2013-081954, filed Apr. 10, 2013, the entire contents of which are incorporated herein by reference.

FIELD

Embodiments described herein relate generally to an electronic apparatus which processes an image, and an image processing method for use in this device.

BACKGROUND

In recent years, various kinds of electronic apparatuses which can capture images, such as camera-equipped personal computers, PDAs, mobile phones or smartphones, or digital cameras, have been gaining in popularity.

An image captured by such an electronic apparatus includes noise due to characteristics of an image sensor. Thus, in some cases, the electronic apparatus provides a function for reducing noise in the image.

As a method of reducing noise, there is known a method of using a plurality of images which have been successively captured. By using the plural images, for example, random noise due to characteristics of the image sensor can be reduced.

However, when a subject is a moving object, it is possible that a proper image cannot be obtained since the position of the subject varies between the successively captured images.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is a view for explaining an example in which noise in an image is reduced by using an average image of a plurality of images.

FIG. 4 is a view for explaining an example in which noise in an image is reduced by using a weighted average image of a plurality of images.

FIG. 5 is an exemplary block diagram illustrating a functional configuration of an image processing program executed by the electronic apparatus of the embodiment.

FIG. 6 is a view for explaining an example in which the image quality of a plurality of images capturing a moving object is improved by the electronic apparatus of the embodiment.

DETAILED DESCRIPTION

Various embodiments will be described hereinafter with reference to the accompanying drawings.

In general, according to one embodiment, an electronic apparatus includes an average image calculator and an image quality processor. The average image calculator is configured to calculate a weighted average image from a first image, a second image and a third image, by using a weight based on a first difference between the first image and the second image and a second difference between the first image and the third image. The image quality processor is configured to apply, based on the weight, an image quality process of a first intensity to a first position in the weighted average image, to apply, based on the weight, an image quality process of a second intensity to a second position in the weighted average image, the second intensity weaker than the first intensity, and to apply, based on the weight, an image quality process of a third intensity to a third position in the weighted average image, the third intensity weaker than the second intensity.

Figure 1:
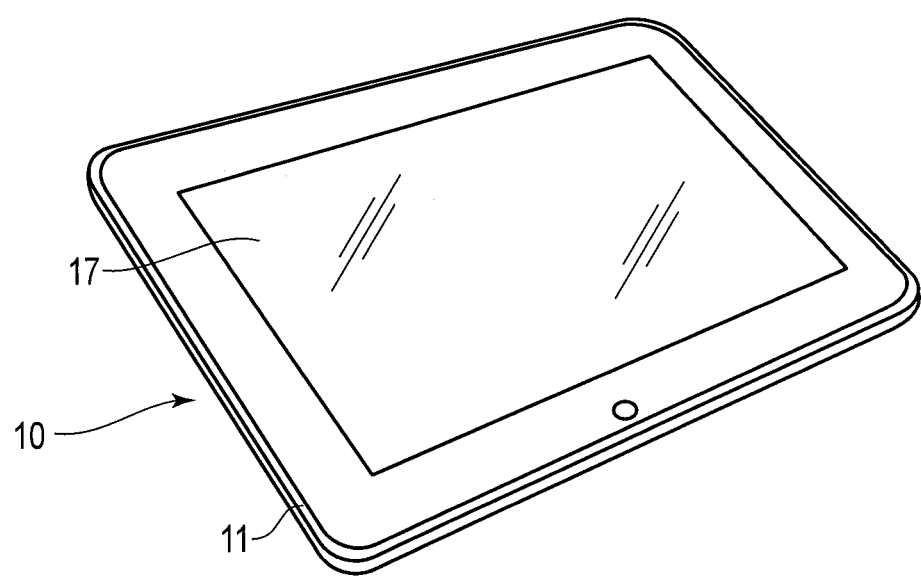
FIG. 1 is an exemplary perspective view illustrating an external appearance of an electronic apparatus according to an embodiment.

FIG. 1 is a perspective view illustrating an external appearance of an electronic apparatus according to an embodiment. The electronic apparatus may be realized as an embedded system which is built in various kinds of electronic apparatuses such as a tablet computer, a notebook-type personal computer, a smartphone, a PDA, or a digital camera. In the description below, the case is assumed that this electronic apparatus is realized as a tablet computer 10. The tablet computer 10 is a portable electronic apparatus also called "tablet" or "slate computer". As shown in FIG. 1, the tablet computer 10 includes a main body 11 and a touch-screen display 17. The touch-screen display 17 is attached such that the touch-screen display 17 is laid over the top surface of the main body 11.

The main body 11 has a thin box-shaped housing. In the touch-screen display 17, a flat-panel display and a sensor are assembled. The sensor is configured to detect a touch position of a pen or a finger on the screen of the flat-panel display. The flat-panel display may be, for instance, a liquid crystal display (LCD). As the sensor, for example, use may be made of an electrostatic capacitance-type touch panel, or an electromagnetic induction-type digitizer.

In addition, the main body 11 is provided with a camera module for capturing an image from a lower side (backside) of the main body 11.

Figure 2:
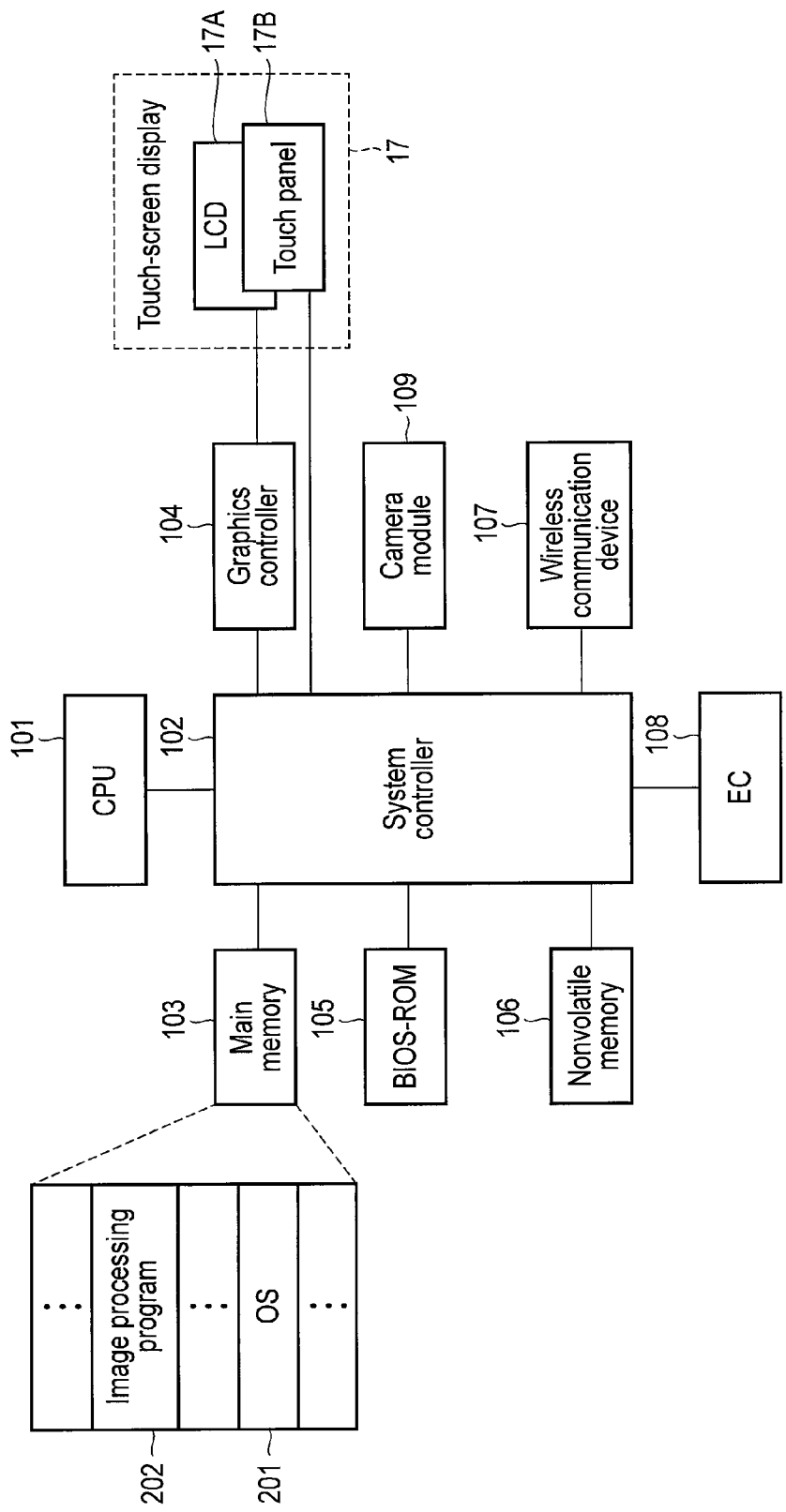
FIG. 2 is an exemplary block diagram illustrating a system configuration of the electronic apparatus of the embodiment.

FIG. 2 shows a system configuration of the tablet computer 10.

As shown in FIG. 2, the tablet computer 10 includes a CPU 101, a system controller 102, a main memory 103, a graphics controller 104, a BIOS-ROM 105, a nonvolatile memory 106, a wireless communication device 107, an embedded controller (EC) 108, and a camera module 109.

The CPU 101 is a processor which controls the operations of various modules in the tablet computer 10. The CPU 101 executes various kinds of software, which are loaded from the nonvolatile memory 106 that is a storage device into the main memory 103. The software includes an operating system (OS) 201 and various application programs. The application programs include an image processing program 202. The image processing program 202 includes, for example, a function of reducing (eliminating) noise in an image captured by using the camera module 109, and a function of sharpening an image.

In addition, the CPU 101 executes a basic input/output system (BIOS) stored in the BIOS-ROM 105. The BIOS is a program for hardware control.

The system controller 102 is a device which connects a local bus of the CPU 101 and various components. The system controller 102 includes a memory controller which access-controls the main memory 103. In addition, the system controller 102 includes a function of communicating with the graphics controller 104 via, e.g. a PCI EXPRESS serial bus.

The graphics controller 104 is a display controller which controls an LCD 17A that is used as a display monitor of the tablet computer 10. A display signal, which is generated by the graphics controller 104, is sent to the LCD 17A. The LCD 17A displays a screen image based on the display signal. A touch panel 17B is disposed on the LCD 17A.

The wireless communication device 107 is a device configured to execute wireless communication such as wireless LAN or 3G mobile communication. The EC 108 is a one-chip microcomputer including an embedded controller for power management. The EC 108 includes a function of powering on or powering off the tablet computer 10 in accordance with an operation of a power button by the user.

The camera module 109 captures an image, for example, in response to the user's touching (tapping) of a button (graphical object) displayed on the screen of the touch-screen display 17. The camera module 109 can also capture a plurality of successive images, such as a moving picture.

In some cases, noise due to characteristics of an image sensor occurs in an image generated by photographing with use of the camera module 109. In addition, when the shutter speed is increased in order to suppress the influence of a camera shake by the user at the time of photographing, the sensitivity of the image sensor is increased in general. Thus, there is a possibility that noise on the generated image increases.

As a method of reducing such noise, it is thinkable to align a plurality of images in which an object is successively photographed and to composite these images. This compositing is, for example, generation of an average image by calculating an average of pixel values of corresponding pixels between the aligned images.

For example, a description is given of a case of generating an image in which noise has been reduced, by using (N+1) input images $I_0$ to $I_N$. It is assumed that the input images $I_0$ to $I_N$ have already been aligned by using feature point tracing between the images or by using motion vectors detected between the images. As indicated by equation 1, each input image $I_i$ (i=0 to N) is expressed by the sum of an image signal $S_i$ and noise $E_i$.

$$I_i = S_i + E_i \quad \text{(equation 1)}$$

In the description below, as regards the input image $I_i$, unless it is necessary to distinguish positions (x, y) of pixels in the image, $I(x, y)_i$ is described as $I_i$. The same applies to other variables. In addition, noise $E_i$ included in the input image $I_i$ is, for example, random noise.

An average image, which is obtained by averaging (compositing) (N+1) input images $I_i$, is expressed by the following equation.

$$\text{Average image } \hat{I} = \frac{1}{N+1} \sum_{i=0}^{N} (S_i + E_i) \quad \text{(equation 2)}$$

Then, since the (N+1) input images $I_i$ have been aligned, $S_0 = S_i = \ldots = S_i = \ldots = S_N$. Accordingly, the average image is given by the following equation.

$$\text{Average image } \hat{I} = S_0 + \frac{1}{N+1} \sum_{i=0}^{N} E_i \quad \text{(equation 3)}$$

Since noise $E_i$ is random noise, the amount of increase due to addition is small (e.g. noise is canceled by addition), and the noise decreases relative to the image signal, as the number of input images becomes larger. Thus, in the average image calculated by equation 3, the signal-to-noise ratio (S/N ratio) is improved.

In an example illustrated in FIG. 3, by using the above-described method, three images 41, 40 and 42 in a time-series order, which were successively photographed, are aligned, and an average of pixel values of corresponding pixels between the aligned images is calculated, whereby an average image 45 is generated.

In the meantime, if a subject of the images 40, 41 and 42 is a moving object, there is a case in which the subject moves while the images 40, 41 and 42 are being photographed. As illustrated in FIG. 3, with the movement of an airplane being a subject during the photographing of a first reference image 41 and a base image 40, the position of an airplane 41A in the first reference image 41 has changed to the position of an airplane 40A in the base image 40. Further, while the base image 40 and a second reference image 42 are being photographed, with the movement of a person and the airplane being the subject, the position of the airplane 40A in the base image 40 has changed to the position of an airplane 42A in the second reference image 42, and also the position of a person 40B in the base image 40 has changed to the position of a person 42B in the second reference image 42.

In this manner, in the case where the subject is moving while the images 40, 41 and 42 are being photographed, the subjects which have moved are multiply composited on the average image 45 in which the noise of the images 40, 41 and 42 is reduced. In the average image 45 shown in FIG. 3, an airplane 45A and a person 45B, which have moved while the images 40, 41 and 42 were being photographed, are multiply composited.

In order to avoid the multiple compositing of the subject on the average image 45, it is thinkable to perform a subject motion based correction in which the images 40, 41 and 42 are not composited in the area (hereinafter referred to as "moving object area") on the images 40, 41 and 42 where the subject is moving, that is, not to average the pixel values of corresponding pixels between the images 40, 41 and 42.

In an example illustrated in FIG. 4, moving object areas in two images are detected based on a difference between the two images, and the two images are not composited in the moving object area. Thereby, multiple compositing of the moving object is avoided in an image (output image) in which noise has been reduced.

For example, based on a difference 461 between the base image 40 and the first reference image 41, a weight map 47 is calculated. The weight map 47 is composed such that the pixel values of corresponding pixels between the images are not averaged in an area (moving object area) 47A which corresponds to the moving air plane 40A, 41A, and the pixel values of corresponding pixels between the images are averaged in the other area (still object area) 47B. The weight map 47 is composed, for example, such that the pixel values of the pixels in the base image 40 are used in an area in a weighted average image 462 corresponding to the moving object area 47A. By using the calculated weight map 47, the weighted average image 462 between the first reference image 41 and the base image 40 is calculated.

Similarly, based on a difference 463 between the base image 40 and the second reference image 42, a weight map 48 is calculated. The weight map 48 is composed such that the pixel values of corresponding pixels between the images 40, 42 are not averaged in an area 48A which corresponds to the moving air plane 40A, 42A, and in an area 48B which corresponds to the moving person 40B, 42B, and the pixel values of corresponding pixels between the images 40, 42 are averaged in the other area 48C. The weight map 48 is composed, for example, such that the pixel values of the pixels in the base image 40 are used in an area in a weighted average image 464 corresponding to the moving object areas 48A and 48B. By using the calculated weight map 48, the weighted average image 464 between the base image 40 and the second reference image 42 is calculated.

Then, by calculating an average image 49 between the weighted average image 462 and weighted average image 464, an image with reduced noise can be obtained without the moving object being multiply composited. However, in the calculated average image 49, since the pixel values of corresponding pixels between the plural images 40, 41 and 42 are not averaged in areas 49A and 49B corresponding to the moving object areas 47A, 48A and 48B, noise has not been reduced (eliminated) in these areas 49A and 49B. In addition, when the average image 49 is sharpened, since the noise (residual noise), which has not been reduced (eliminated), is amplified in the areas 49A and 49B corresponding to the moving object areas 47A, 48A and 48B, it is possible that the image quality lowers.

Thus, in the present embodiment, a configuration is provided for reducing noise even in the moving object area, and for properly sharpening the image.

Referring now to FIG. 5, a description is given of an example of the functional configuration of the image processing program 202 which is executed by the computer 10 of the embodiment. The image processing program 202 includes, for example, an alignment module 31, a weight map generator 32, an integration composite amount calculator 33, an average image calculator 34, and an adaptive image quality processor 35. For example, in this image processing program 202, a plurality of images, which have been successively captured by using the camera module 109, are input. In the description below, also referring to FIG. 6, the case in which three successively captured images 40, 41 and 42 are input is described by way of example. However, the image processing program 202 can similarly process an arbitrary number of images.

To begin with, the alignment module 31 aligns the input images 40, 41 and 42. Specifically, the alignment module 31 detects correspondence of pixels between the input images 40, 41 and 42. The alignment module 31 aligns plural images, for example, by using a process of calculating motion vectors between the images, or a process of tracing feature points between the images.

Subsequently, the weight map generator 32 generates a weight map by using two aligned images. Specifically, as shown in FIG. 6, the weight map generator 32 calculates a difference (first difference) 561 between a pixel value of a pixel in the base image 40, and a pixel value of a pixel in the first reference image 41 which correspond to the pixel in the base image 40. The weight map generator 32 then calculates a weight 51 based on the difference 561.

The weight 51 is, for example, a value from 0 to 1. The weight 51 is indicative of, for example, a weight for a pixel value of a pixel in the first reference image 41 which correspond to a pixel value of a pixel in the base image 40, when the weight for the pixel value of the pixel in the base image 40 is set to be 1. For example, the weight map generator 32 calculates a weight=1 if the difference between the pixel values equals 0, and calculates a weight of less than 1 if the difference between the pixel values is greater than 0 (for example, a smaller weight as the difference between the pixel values becomes greater). Incidentally, the weight map generator 32 may calculate a weight=1 if the difference between the pixel values is less than a threshold, and may calculate a weight=0 if the difference between the pixel values is the threshold or more.

In this manner, the weight map generator 32 generates the weight map 51 including the weight associated with each of the pixels. The weight map generator 32 sets a value, which becomes smaller as the difference between the images increases, for the weight corresponding to an area 51A in which a difference occurs between the base image 40 and the first reference image 41 (i.e. for the weight corresponding to an area including a moving object). In addition, the weight map generator 32 sets 1 for the weight corresponding to an area in which no difference occurs between the base image 40 and the first reference image 41 (i.e. for the weight corresponding to an area including a still object). Incidentally, the weight map generator 32 may set 1 for the weight of an area 51B with a difference of less than a threshold, and may set 0 for the weight of an area 51A with a difference of the threshold or more.

Similarly, the weight map generator 32 calculates a difference (second difference) 563 between a pixel values of a pixel in the base image 40, and a pixel value of a pixel in the second reference image 42 which correspond to the pixel in the base image 40, and calculates a weight 52 based on the difference 563. The calculated weight 52 is indicative of, for example, a weight for the pixel value of the pixel in the second reference image 42 which correspond to the pixel value of the pixel in the base image 40, when the weight for the pixel value of the pixel in the base image 40 is set to be 1. For example, the weight map generator 32 calculates a weight=1 if the difference between the pixel values is 0, and calculates a weight of less than 1 if the difference between the pixel values is greater than 0 (for example, a weight of a smaller value as the difference between the pixel values becomes greater). Incidentally, the weight map generator 32 may calculate a weight=1 if the difference between the pixel values is less than a threshold, and may calculate a weight=0 if the difference between the pixel values is the threshold or more.

In this manner, the weight map generator 32 generates the weight map 52 including the weight associated with each of the pixels. The weight map generator 32 sets a value, which becomes smaller as the difference between the images increases, for the weight corresponding to an area 52A, 52B, in which a difference occurs between the base image 40 and the second reference image 42 (i.e. for the weight corresponding to an area including a moving object). In addition, the weight map generator 32 sets 1 for the weight corresponding to an area in which no difference occurs between the base image 40 and the second reference image 42 (i.e. for the weight corresponding to an area including a still object). Incidentally, the weight map generator 32 may set 1 for the weight of an area 52C with a difference of less than a threshold, and may set 0 for the weight of the area 52A, 52B with a difference of the threshold or more.

Besides, the weight map generator 32 may calculate the weight by using not the above-described difference between the images, but a difference (an error) between the images calculated when the two images are aligned by the alignment module 31. The alignment module 31 calculates a difference between pixel values or a difference between pixel blocks between the images, in the process of calculating motion vectors between the images or the process of tracing feature points between the images. By using the difference calculated at the time of alignment, the weight map generator 32 can reduce the processing volume. Furthermore, the weight map generator 32 may determine the weight by smoothing (de-blocking) the weight at the boundary between pixel blocks, after calculating the weight not in units of a pixel, but in units of a pixel block.

Next, the average image calculator 34 calculates a weighted average image between the base image 40, the first reference image 41 and the second reference image 42, by using the weight based on the difference between the base image 40 and the first reference image 41 and the difference between the base image 40 and the second reference image 42.

To be more specific, by using the weight map 51 generated by the weight map generator 32, the average image calculator 34 calculates a weighted average image 562 between the base image 40 and the first reference image 41. Specifically, the average image calculator 34 calculates a weighted average between the pixel in the base image 40 and the corresponding pixel in the first reference image 41, based on the corresponding weight in the weight map 51.

Similarly, by using the weight map 52, the average image calculator 34 calculates a weighted average image 564 between the base image 40 and the second reference image 42. Specifically, the average image calculator 34 calculates a weighted average between the pixel in the base image 40 and the corresponding pixel in the second reference image 42, based on the corresponding weight in the weight map 52.

Then, the average image calculator 34 calculates an average image 54 between the weighted average image 562 between the base image 40 and the first reference image 41, and the weighted average image 564 between the base image 40 and the second reference image 42. Thus, this average image (weighted average image) 54 is calculated by equation 4. In equation 4, $I_0$ is indicative of a base image, and $\alpha_i$ is indicative of weights (weight map) for calculating weighted averages between the base image and an i-th reference image.

$$\text{Weighted average image } \hat{I}_N = \frac{1}{N}\sum_{i=1}^{N} \frac{I_0 + \alpha_i I_i}{1 + \alpha_i} \quad \text{(equation 4)}$$

Incidentally, in order to reduce the consumed resource amount of the memory, etc., the average image 54 may be calculated by compositing (weighted-averaging) a plurality of input images one by one, by using a recurrence equation indicated by equation 5.

$$\begin{cases} \hat{I}_0 = I_0 \\ \hat{I}_n = (1 - \frac{\alpha_n}{n+1})\hat{I}_{n-1} + \frac{\alpha_n}{n+1}I_n \end{cases} \quad \text{(equation 5)}$$

The integration composite amount calculator 33 also calculates an average weight map 53 in which the weight map 51 and the weight map 52 are averaged. This average weight map 53 can be expressed by equation 6.

$$\text{Average weight } \hat{\alpha}_N = \frac{1}{N}\sum_{i=1}^{N} \alpha_i \quad \text{(equation 6)}$$

In the meantime, in order to reduce the consumed resource amount of the memory, etc., the average weight map 53 may be calculated by compositing (averaging) a plurality of weight maps one by one, by using a recurrence equation indicated by equation 7.

$$\begin{cases} \hat{\alpha}_0 = 0 \\ \hat{\alpha}_n = \frac{n-1}{n}\hat{\alpha}_{n-1} + \frac{1}{n}\alpha_n \end{cases} \quad \text{(equation 7)}$$

$\hat{\alpha}=1$ may be used.

Next, the adaptive image quality processor 35 calculates an image (output image) 55 in which noise has been reduced, by using the average image 54 and average weight map 53. To be more specific, by applying a predetermined filter to the average image 54, the adaptive image quality processor 35 generates a smoothed image $I_L$. As this predetermined filter, for example, use is made of a smoothing filter (a box filter, a Gaussian filter, etc), or a noise elimination filter (bilateral, NL-means, etc.). Then, using the average weight map 53, the adaptive image quality processor 35 generates an image (output image) in which noise has been reduced, by executing weighted addition (i.e. alpha-blending) between the average image 54 and the smoothed image $I_L$. The adaptive image quality processor 35 can generate an image in which noise has been reduced, for example, by a calculation based on equation 8.

$$\text{Noise-reduced image } \hat{I} = \hat{\alpha}_N \hat{I}_N + (1 - \hat{\alpha}_N)I_L \quad \text{(equation 8)}$$

The case is now assumed that a weight=1 is set in the area 51B in the weight map 51, a weight=0 is set in the area 51A, a weight=1 is set in the area 52C in the weight map 52, and a weight=0 is set in the areas 52A and 52B. In this case, the integration composite amount calculator 33 sets a weight=1 in the area 53, a weight=0.5 in the areas 53A, 53C and 53D, and a weight=0 in the area 53B in the average weight map 53 in which the weight map 51 and weight map 52 are averaged.

Then, the adaptive image quality processor 35 applies to the pixel in the average image 54 an image quality process (noise reduction process) with a higher intensity as the weight indicated in the average weight map 53 is greater. To be more specific, based on the average weight map 53, the adaptive image quality processor 35 applies an image quality process of a first intensity to a first position in the average image (weighted average image) 54, the first position corresponding to the area 53B in the average weight map 53. In addition, the adaptive image quality processor 35 applies an image quality process of a second intensity, which is weaker than the first intensity, to a second position in the average image 54, the second position corresponding to the areas 53A, 53C and 53D in the average weight map 53. Furthermore, the adaptive image quality processor 35 applies an image quality process of a third intensity, which is weaker than the second intensity, to a third position in the average image 54, the third position corresponding to the area 53E in the average weight map 53. This image quality process includes a noise reduction process by the above-described weighted addition between the average image 54 and the smoothed image $I_L$, and the weight of the smoothed image $I_L$ increases as the intensity becomes higher. Thereby, the adaptive image quality processor 35 can calculate the image 55 in which noise has been reduced.

Besides, the adaptive image quality processor 35 may apply to the average image 54 an image quality process further including a sharpening process, based on the average weight map 53. To be more specific, the adaptive image quality processor 35 calculates a difference image $I_H$ between the average image 54 and the smoothed image $I_L$. The difference image $I_H$ is indicative of a high-frequency component of the average image 54. Using the average weight map 53, the adaptive image quality processor 35 executes weighted addition between the average image 54, the smoothed image $I_L$ and the difference image (high-frequency component image) $I_H$, thereby generating an image 55 which has been noise-reduced and has been sharpened. For example, by an arithmetic operation based on equation 9, the adaptive image quality processor 35 can generate the image 55 which has been noise-reduced and has been sharpened.

Noise-Reduced and Sharpend Image $$\hat{I} = \hat{\alpha}_N \hat{I}_N + (1 - \hat{\alpha}_N) I_L + \beta I_H \quad \text{(equation 9)}$$

$$\beta(x, y) = \begin{cases} k & \text{if } \hat{\alpha}_N(x, y) = 1 \\ 0 & \text{otherwise} \end{cases}$$

$$I_H = \hat{I}_N - I_L$$

The adaptive image quality processor 35 applies to the pixel in the average image 54 a sharpening process with a higher intensity as the weight indicated in the average weight map 53 is smaller. To be more specific, the adaptive image quality processor 35 applies a sharpening process of a first intensity to the third position in the average image (weighted average image) 54, the third position corresponding to the area 53E in the average weight map 53. In addition, the adaptive image quality processor 35 applies a sharpening process of a second intensity, which is weaker than the first intensity, to the second position in the average image 54, the second position corresponding to the areas 53A, 53C and 53D in the average weight map 53. Furthermore, the adaptive image quality processor 35 applies a sharpening process of a third intensity, which is weaker than the second intensity, to the first position in the average image 54, the first position corresponding to the area 53B in the average weight map 53. This sharpening process includes the above-described process of weighted addition between the average image 54, the smoothed image $I_L$, and the difference image (high-frequency component image) $I_H$. For example, in the sharpening process, the weight of the high-frequency component image $I_H$ increases as the intensity becomes higher. Thereby, the adaptive image quality processor 35 can calculate a sharpened image 55.

In the meantime, since the high-frequency component image $I_H$ is the difference between the average image 54 and the smoothed image $I_L$, as described above, equation 9 can also be expressed like equation 10.

$$\hat{I} = \hat{I}_N + W(\hat{\alpha}_N) I_H \quad \text{(equation 10)}$$

Figure 7:
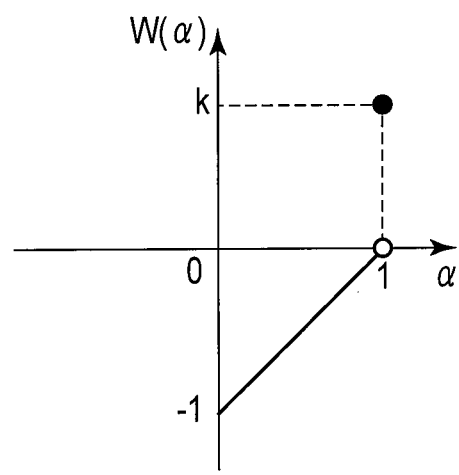
FIG. 7 is a view illustrating an example of a weight function used in an image quality process by the electronic apparatus of the embodiment.
Figure 8:
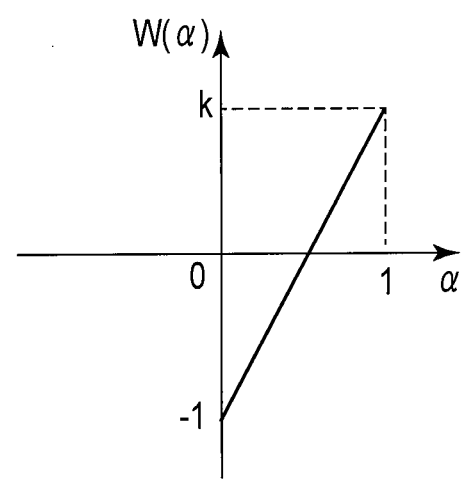
FIG. 8 is a view illustrating another example of the weight function used in the image quality process by the electronic apparatus of the embodiment.

For example, in equation 10, functions as shown in FIG. 7 and FIG. 8 can be used for a weight function $W(\alpha)$ for adding the high-frequency component image $I_H$.

By the above-described structure, the image quality of an image, in which a moving object is photographed, can be enhanced. In the above-described example, the description has been given of the method of calculating the weight α by using the difference between the base image and reference images among the input images. It is preferable that the number of input images be an odd number, since an intermediately photographed image is used as the base image, like the case in which a secondly photographed image among three input images is used as the base image. In addition, the weight α may be calculated by using a difference between an input image and an immediately preceding output image (i.e. immediately preceding image-quality-processed image 55), instead of the difference between the base image and the reference images.

Figure 9:
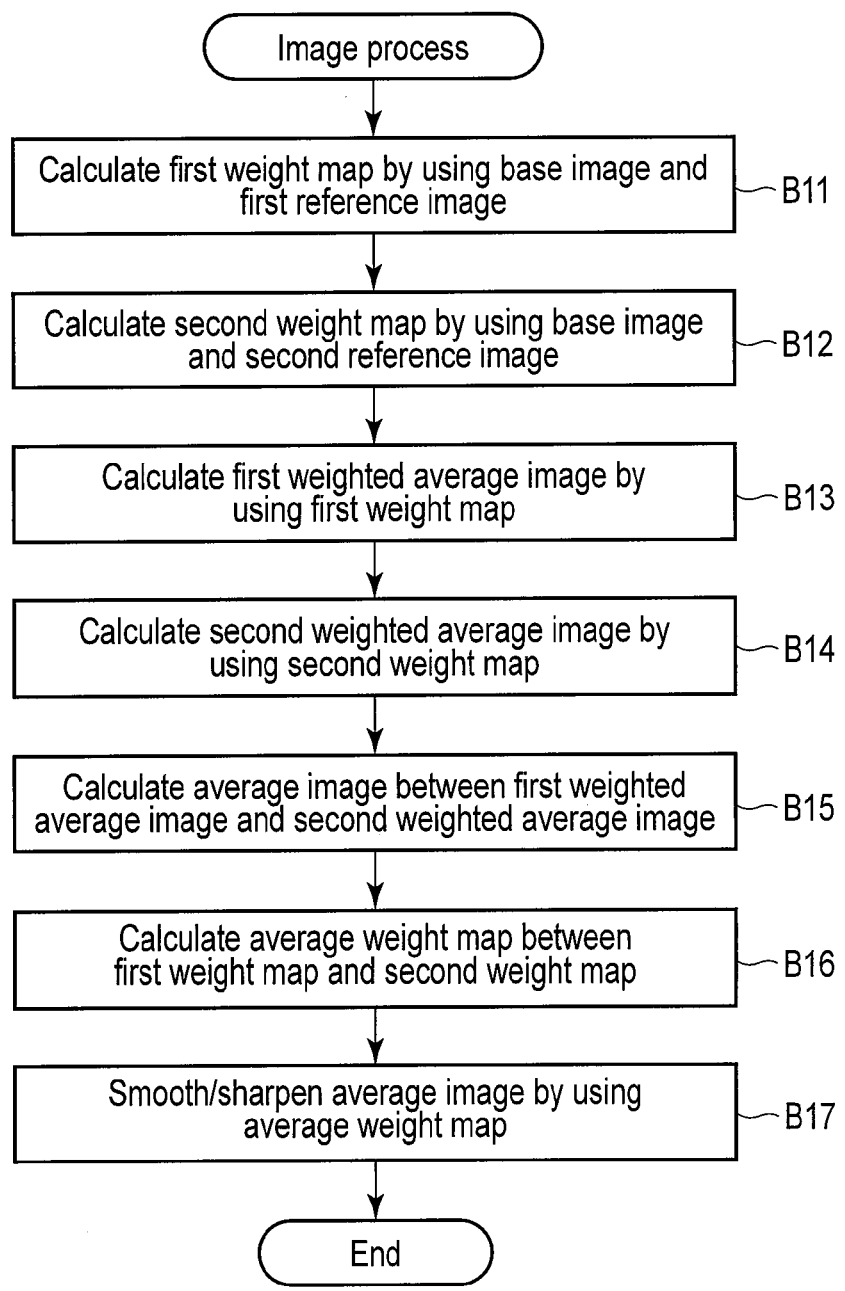
FIG. 9 is a flowchart illustrating an example of the procedure of an image process executed by the electronic apparatus of the embodiment.

Next, referring to a flowchart of FIG. 9, a description is given of an example of the procedure of an image process executed by the tablet computer 10. In the description below, it is assumed that the alignment between a plurality of images for use in the image process (i.e. the detection of corresponding pixels between the images) has been completed.

To start with, the weight map generator 32 generates a first weight map 51 by using a base image 40 and a first reference image 41 (block B11). The weight map generator 32 calculates a difference between the pixel value of the pixel in the base image 40 and the pixel value of the corresponding pixel in the first reference image 41, and calculates a weight based on this difference.

In addition, the weight map generator 32 generates a second weight map 52 by using the base image 40 and a second reference image 42 (block B12). The weight map generator 32 calculates a difference between the pixel value of the pixel in the base image 40 and the pixel value of the corresponding pixel in the second reference image 42, and calculates a weight based on this difference.

Subsequently, using the calculated first weight map 51, the average image calculator 34 calculates a weighted average image (first weighted average image) 562 between the base image 40 and the first reference image 41 (block B13). Similarly, using the calculated second weight map 52, the average image calculator 34 calculates a weighted average image (second weighted average image) 564 between the base image 40 and the second reference image 42 (block B14). Then, the average image calculator 34 calculates an average image 54 between the first weighted average image 562 and the second weighted average image 564 (block B15).

The integration composite amount calculator 33 calculates an average weight map 53 between the first weight map 51 and the second weight map 52 (block B16). Then, the adaptive image quality processor 35 smoothes the average image 54 by using the calculated average weight map 53 (block B17). For example, based on the weight indicated by the average weight map 53, the adaptive image quality processor 35 executes an image quality process of blending the pixel in the average image 54 and the pixel in a smoothed image which is obtained by applying a smoothing filter to the average image 54. Incidentally, the adaptive image quality processor 35 may execute an image quality process of smoothing and sharpening the average image 54, by using the average weight map 53.

As has been described above, according to the present embodiment, the image quality of the image in which a moving object is photographed can be enhanced. The average image calculator 34 calculates the weighted average image 54 between the base image 40, first reference image 41 and second reference image 42, by using the weight based on the first difference 561 between the base image 40 and first reference image 41 and the second difference 563 between the base image 40 and second reference image 42. Based on the weight, the adaptive image quality processor 35 applies an image quality process of a first intensity to a first position 53B in the weighted average image 54, applies an image quality process of a second intensity, which is weaker than the first intensity, to a second position 53A, 53C, 53D in the weighted average image 54, and applies an image quality process of a third intensity, which is weaker than the second intensity, to a third position 53E in the weighted average image 54. Thereby, even in the case where a moving object is included in a plurality of photographed images 40, 41 and 42, the image quality can be enhanced by using these images 40, 41 and 42.

All the procedures of the image process of the present embodiment can be executed by software. Thus, the same advantageous effects as with the present embodiment can easily be obtained simply by installing a computer program, which executes the procedures of the image process, into an ordinary computer through a computer-readable storage medium which stores the computer program, and by executing the computer program.

The various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
    circuitry configured to:
        calculate a weighted average image from a first image, a second image and a third image, by using a weight based on a first difference between the first image and the second image and a second difference between the first image and the third image; and
        apply, based on the weight, an image quality process of a first intensity to a first position in the weighted average image, apply, based on the weight, an image quality process of a second intensity to a second position in the weighted average image, the second intensity weaker than the first intensity, and apply, based on the weight, an image quality process of a third intensity to a third position in the weighted average image, the third intensity weaker than the second intensity.

2. The electronic apparatus of claim 1, wherein the circuitry is configured to further apply a sharpening process to the weighted average image, based on the weight.

3. The electronic apparatus of claim 2, wherein the circuitry is configured to apply, based on the weight, a sharpening process of the first intensity to the third position, to apply a sharpening process of the second intensity to the second position, and to apply a sharpening process of the third intensity to the first position.

4. The electronic apparatus of claim 1, wherein the circuitry is configured to calculate a first weight based on the first difference and a second weight based on the second difference, and
    to calculate a first weighted average image between the first image and the second image by using the first weight, to calculate a second weighted average image between the first image and the third image by using the second weight, and to use an average image between the first weighted average image and the second weighted average image as the weighted average image.

5. The electronic apparatus of claim 4, wherein the circuitry is configured to calculate an average weight between the first weight and the second weight, and
    to apply, based on the average weight, the image quality process of the first intensity to the first position, apply, based on the average weight, the image quality process of the second intensity to the second position, and apply, based on the average weight, the image quality process of the third intensity to the third position.

6. The electronic apparatus of claim 4, wherein the circuitry is configured to calculate an average weight between the first weight and the second weight, and
    to apply a sharpening process to the weighted average image, based on the average weight.

7. An image processing method comprising:
    calculating a weighted average image from a first image, a second image and a third image, by using a weight based on a first difference between the first image and the second image and a second difference between the first image and the third image; and
    applying, based on the weight, an image quality process of a first intensity to a first position in the weighted average image, applying, based on the weight, an image quality process of a second intensity to a second position in the weighted average image, the second intensity weaker than the first intensity, and applying, based on the weight, an image quality process of a third intensity to a third position in the weighted average image, the third intensity weaker than the second intensity.

8. A non-transitory computer-readable storage medium storing a program which is executable by a computer, the program controlling the computer to execute functions of:
    calculating a weighted average image from a first image, a second image and a third image, by using a weight based on a first difference between the first image and the second image and a second difference between the first image and the third image; and
    applying, based on the weight, an image quality process of a first intensity to a first position in the weighted average image, applying, based on the weight, an image quality process of a second intensity to a second position in the weighted average image, the second intensity weaker than the first intensity, and applying, based on the weight, an image quality process of a third intensity to a third position in the weighted average image, the third intensity weaker than the second intensity.

9. The method of claim 7, further comprising applying a sharpening process to the weighted average image, based on the weight.

10. The method of claim 9, wherein the applying the sharpening comprises applying, based on the weight, a sharpening process of the first intensity to the third position, applying a sharpening process of the second intensity to the second position, and applying a sharpening process of the third intensity to the first position.

11. The method of claim 7, further comprising calculating a first weight based on the first difference and a second weight based on the second difference,
    wherein the applying the image quality process comprises calculating a first weighted average image between the first image and the second image by using the first weight, calculating a second weighted average image between the first image and the third image by using the second weight, and using an average image between the first weighted average image and the second weighted average image as the weighted average image.

12. The method of claim 11, wherein:

the calculating the first weight and the second weight comprises calculating an average weight between the first weight and the second weight; and the applying the image quality process comprises applying, based on the average weight, the image quality process of the first intensity to the first position, applying, based on the average weight, the image quality process of the second intensity to the second position, and applying, based on the average weight, the image quality process of the third intensity to the third position.

13. The method of claim 11, wherein the calculating the first weight and the second weight comprises calculating an average weight between the first weight and the second weight, and the method further comprises applying a sharpening process to the weighted average image, based on the average weight.

14. The medium of claim 8, the program further controlling the computer to execute function of applying a sharpening process to the weighted average image, based on the weight.

15. The medium of claim 14, wherein the applying the sharpening comprises applying, based on the weight, a sharpening process of the first intensity to the third position, applying a sharpening process of the second intensity to the second position, and applying a sharpening process of the third intensity to the first position.

16. The medium of claim 8, the program further controlling the computer to execute function of calculating a first weight based on the first difference and a second weight based on the second difference, wherein the applying the image quality process comprises calculating a first weighted average image between the first image and the second image by using the first weight, calculating a second weighted average image between the first image and the third image by using the second weight, and using an average image between the first weighted average image and the second weighted average image as the weighted average image.

17. The medium of claim 16, wherein:

the calculating the first weight and the second weight comprises calculating an average weight between the first weight and the second weight; and the applying the image quality process comprises applying, based on the average weight, the image quality process of the first intensity to the first position, applying, based on the average weight, the image quality process of the second intensity to the second position, and applying, based on the average weight, the image quality process of the third intensity to the third position.

18. The medium of claim 16, wherein the calculating the first weight and the second weight comprises calculating an average weight between the first weight and the second weight, and the program further controls the computer to execute function of applying a sharpening process to the weighted average image, based on the average weight.

* * * * *